C. B. KING, B. JACOBY & H. E. ROUSH.
STEERING DEVICE FOR REVOLVING SHOVELS AND THE LIKE.
APPLICATION FILED OCT. 24, 1917.
1,267,422.
Patented May 28, 1918.
2 SHEETS—SHEET 2.
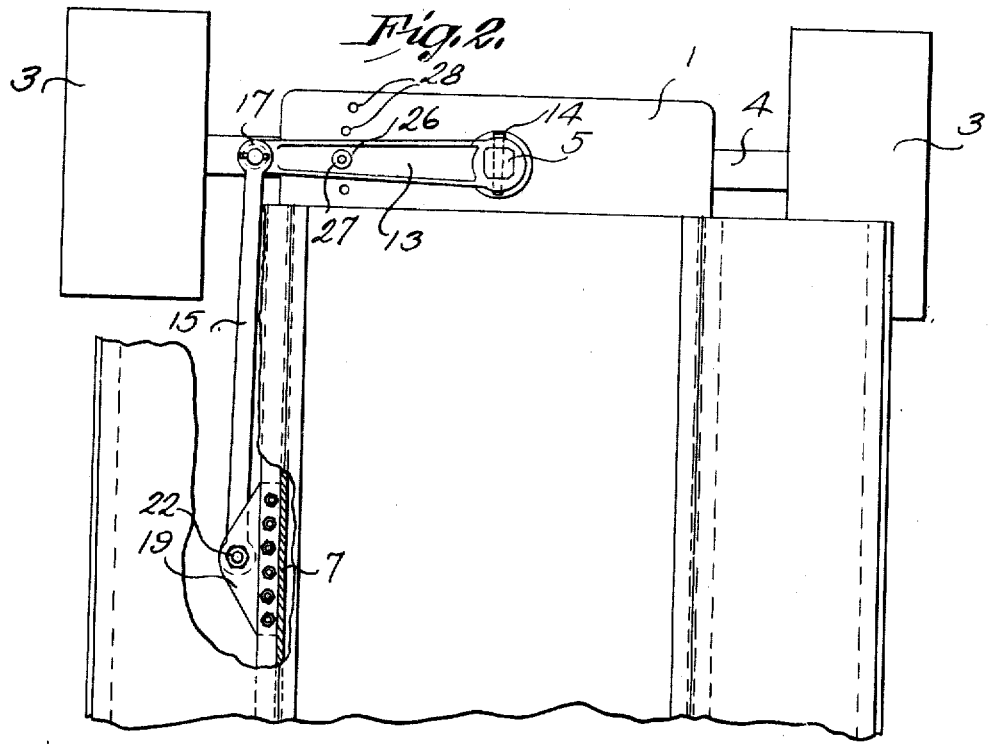
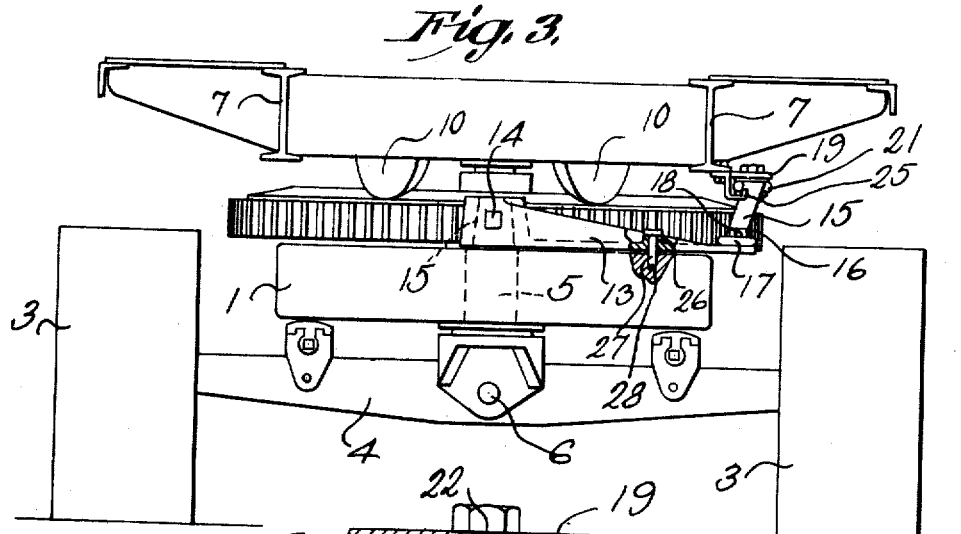
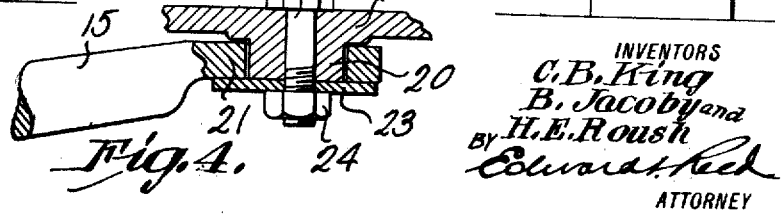
INVENTORS
C. B. King
B. Jacoby and
BY H. E. Roush
Edward Reed
ATTORNEY

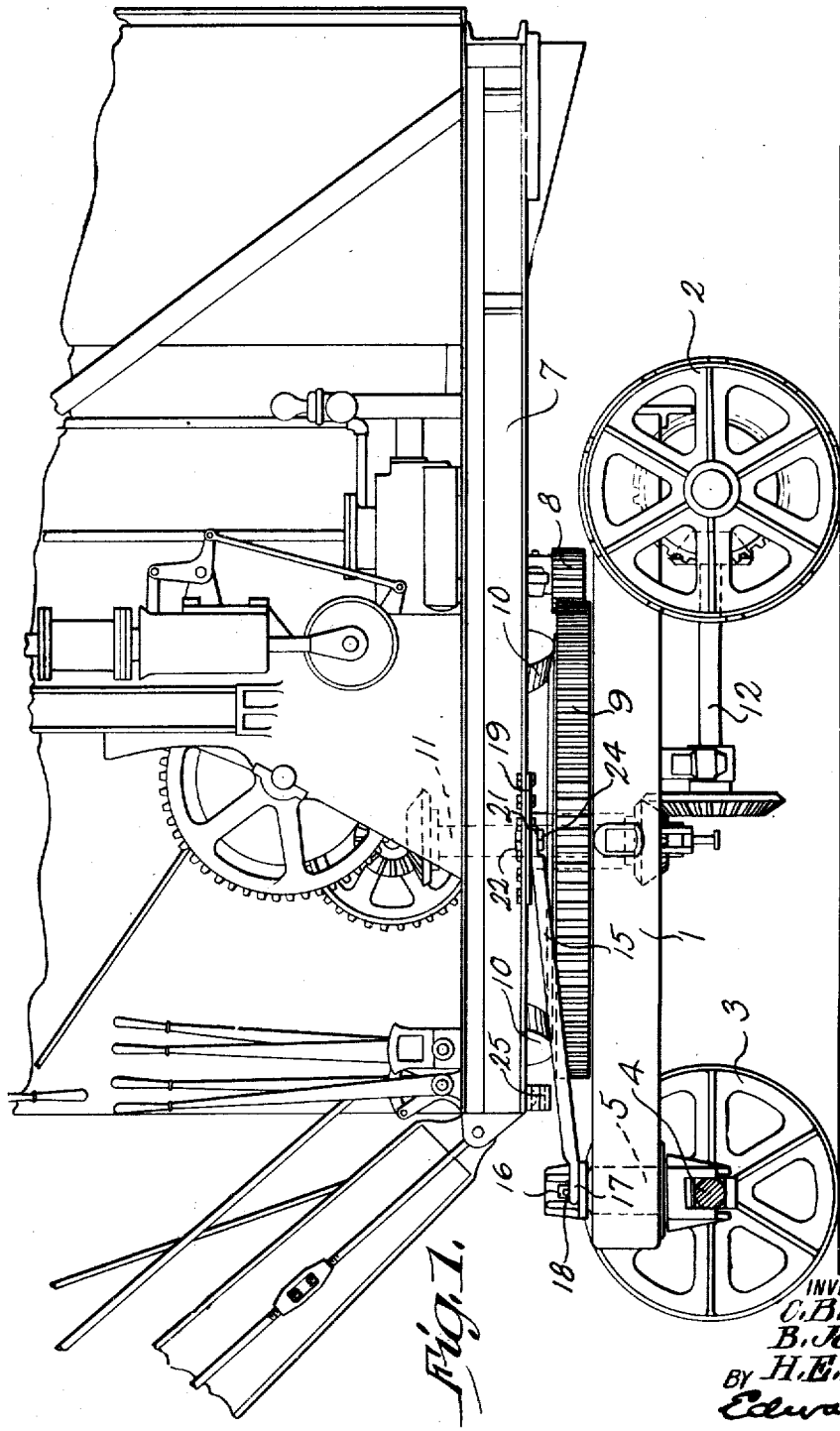

UNITED STATES PATENT OFFICE.

CHARLES B. KING, BENJAMIN JACOBY, AND HERBERT E. ROUSH, OF MARION, OHIO, ASSIGNORS TO THE MARION STEAM SHOVEL COMPANY, OF MARION, OHIO, A CORPORATION OF OHIO.

STEERING DEVICE FOR REVOLVING SHOVELS AND THE LIKE.

1,267,422.   Specification of Letters Patent.   Patented May 28, 1918.

Application filed October 24, 1917. Serial No. 198,225.

*To all whom it may concern:*

Be it known that we, CHARLES B. KING, BENJAMIN JACOBY, and HERBERT E. ROUSH, citizens of the United States, residing at Marion, in the county of Marion and State of Ohio, have invented certain new and useful Improvements in Steering Devices for Revolving Shovels and the like, of which the following is a specification, reference being had therein to the accompanying drawing.

This invention relates to steering devices for revolving shovels and the like.

In a mechanism of this kind it is desirable that the swinging movement of the revolving platform, which carries the excavating, or other, mechanisms, should be utilized for imparting steering movement to the steering axle when the machine is being propelled over the ground. The object of the invention is to provide a strong, durable device for connecting the revolving platform with the axle, which will be very simple in its construction and operation; and further, to provide such a device which may be easily manipulated to connect the platform with, or disconnect the same from, the axle.

To this end it is also an object of the invention to provide a steering device of this kind, the parts of which will be connected directly with and carried by the axle and the platform, thus eliminating the use of intermediate devices supported on other parts of the mechanism, and of guide-ways and the like.

In the accompanying drawings Figure 1 is a side elevation of a revolving shovel, partially broken away, showing our invention applied thereto; Fig. 2 is a plan view of the forward portion of such a machine, with the excavating and power mechanisms removed, partially broken away to show the invention applied thereto; Fig. 3 is a front elevation of the mechanism shown in Fig. 2; and Fig. 4 is a sectional detail view of the connection between the steering device and the platform.

In these drawings we have illustrated one embodiment of our invention and have shown the same as applied to a revolving shovel of a well known type, but it will be understood that the invention is applicable to machines of various kinds which comprise structures having swinging movement which can be utilized for steering purposes. The revolving shovel here shown comprises a truck consisting of a base 1 supported at its rear end upon traction wheels 2 and at its forward end by steering wheels 3, which are connected thereto by a steering axle 4, which axle comprises an upwardly extending trunnion, or pivot pin, 5 mounted in one end of the base 1. Preferably the upwardly extending trunnion, or pivoted pin, of the axle is pivotally connected to the body portion 4 thereof, as shown at 6, to permit the axle to accommodate itself to any qualities in the supporting surface. Pivotally mounted upon the truck is a platform 7 which carries the excavating and power mechanisms. This platform is rotated by means of a pinion 8 carried by the platform and meshing with an annular rack 9 secured to the base 1 and arranged concentrically of the axis of rotation of the platform. Rollers 10 interposed between the platform and the upper surface of the rack 9 serve to support the platform in a position parallel with the base. The propelling movement is transmitted from the engine on the platform through a central vertical shaft 11 to a horizontal propelling shaft 12 arranged beneath the base 1 and operatively connected with the traction wheels 2. The mechanism described is that of a well known revolving shovel and it will be understood that it is here shown and described for the purpose of illustration only.

The steering mechanism proper, which serves to connect the revolving platform with the axle, comprises but two main parts, one of these parts consists of an arm 13 which is directly connected with the axle in such manner that the movement of the arm will impart steering movement to the axle. Preferably this arm is rigidly secured to the upwardly extending trunnion, or pivot pin, 5 of the axle, and in the present instance the arm is arranged above the base 1 and is provided at one end with a squared opening to receive the squared head of the trunnion 5, and is retained on the trunnion 5 by means of a pin 14 extending through said trunnion and through the apertured portion of the arm. It will be obvious, however, that the arm will be secured to the trunnion of the axle in any suitable manner. That end of the arm opposite the end which is connected with the pivot pin is connected with the swinging frame 7 by means of a link 15, which is pivotally connected at one end with the arm and is pivotally connected at its other end with the platform 7. The connection between the link 15 and the arm 13 is preferably detachable to permit of the parts being separated when the excavating mechanism is in use, or when swinging movement is to be imparted to the platform for purposes other than steering purposes. As here shown we have employed a very simple form of connection, which consists merely of a stud 16 extending upwardly from the outer end of the arm and adapted to receive an apertured end, or eye, 17 of the link. Inasmuch as the link extends upwardly and there is an upward pull on the link it is preferable that some means, such as a cotter pin 18, should be provided to prevent the eye of the link from slipping off the stud. The connection between the link and the swinging platform 7 is a simple pivoted connection which is made loose enough to permit of a limited vertical movement of the outer end of the link, that is, of the end which is connected with the arm. In the present instance we have made this connection by securing to one of the side members of the frame of the platform 7 a bracket 19 having a depending boss 20 to receive an apertured end, or eye, 21 of the link 15. A bolt 22 extends through the bracket and the boss and is provided at its lower end with a washer 23 and a nut 24 to secure the eye of the link in position on the boss. The eye of the link fits loosely about the boss and there is sufficient clearance between the boss and the washer to permit of a limited upward swinging movement of the link, thus permitting the opposite end thereof to move vertically to engage the same with and disengage the same from the arm 13. Preferably a support is provided to receive the link when the steering mechanism is not in use, and as here shown this support comprises a hook-shaped bracket 25 secured to the platform 7 adjacent to the link, thus when the link is disconnected from the arm 13 it is placed in the hook-shaped bracket and is supported in this inoperative position during the normal operation of the shovel or other mechanism.

The operation of the device will be readily understood and it will be apparent that when the arm which is connected with the steering axle is operatively connected with the link which is connected with the platform that any swinging movement imparted to the platform will be transmitted to the axle, and that there will be no lost motion, and consequently the axle will respond instantly and fully to the movement of the platform. The mechanism is exceedingly simple and very strong, and requires the use of no parts mounted on the truck or platform, other than the link 15 which is connected with the platform, requires no guides or connecting devices difficult of access, such as are used when flexible connections are provided between the platform and the axle. Consequently when the device is inoperative there are no parts which can possibly interfere with the normal operation of the machine. The link when idle rests upon its support 25, while the arm lies above the base 1. In the normal operation of shovels of this kind the mechanism is advanced by short steps and it is not ordinarily necessary that any steering movement should be imparted to the steering axle, it being sufficient if this axle is held in a fixed position with relation to the truck as a whole. We have, therefore, provided means for locking the axle against movement relatively to the base 1. As here shown the arm 13 is provided with an apertured boss 26 through which extends a pin 27, the lower end of which is adapted to enter any one of a series of openings 28 in the upper surface of the base 1.

While we have shown and described one embodiment of our invention we do not desire to be limited to the details of construction thereof as various modifications will occur to a person skilled in the art.

Having now fully described our invention, what we claim as new and desire to secure by Letters Patent, is:—

1. In a machine of the character described, a truck comprising a base, a steering axle pivotally connected with said base, and wheels on said axle; a structure mounted on said truck for swinging movement, an arm rigidly connected to said steering axle, and a link connected at one end to said arm and at the other end to said rotatable structure.

2. In a machine of the character described, a truck comprising a base, a steering axle, wheels on said steering axle, and a trunnion connecting said steering axle with said base; a structure mounted on said truck for swinging movement, an arm rigidly secured to said trunnion, and means for operatively connecting said arm with said swinging structure.

3. In a machine of the character described, a truck comprising a base, a steering axle, wheels on said steering axle, and a trunnion connecting said steering axle with said base; a structure mounted on said truck for swinging movement, an arm rigidly secured to said trunnion, and detachable means for operatively connecting said arm with said swinging structure.

4. In a machine of the character described, a truck comprising a base, a steering axle, wheels on said steering axle, and a trunnion connecting said steering axle with said base; a structure mounted on said truck for swinging movement, an arm rigidly secured to said trunnion, and a link connected at one end with said arm and at the other end with said swinging platform.

5. In a machine of the character described, a truck comprising a base, a steering axle, wheels on said steering axle, and a trunnion connecting said steering axle with said base; a structure mounted on said truck for swinging movement, an arm rigidly secured to said trunnion, and a link connected at one end with said swinging platform and detachably connected at its other end with said arm.

6. In a machine of the character described, a truck comprising a base, a steering axle, wheels on said steering axle, and a trunnion connecting said steering axle with said base; a structure mounted on said truck for swinging movement, an arm rigidly secured to said trunnion, a link connected at one end with said swinging platform in a manner to permit the other end thereof to be raised and lowered, means for detachably connecting said other end of said link with said arm, and a support carried by said platform adapted to receive said link when it has been disconnected from said arm.

7. In a machine of the character described, a truck comprising a base, a steering axle, wheels on said steering axle, and a trunnion connecting said steering axle with said base; a structure mounted on said truck for swinging movement, an arm rigidly secured to said trunnion a part carried by said platform and having a boss, and a link having an eye extending about said boss and having its other end connected with said arm.

8. In a machine of the character described, a truck comprising a base, a steering axle, wheels on said axle, and a trunnion connecting said axle with said base; a structure mounted on said truck for swinging movement, detachable steering devices to connect said swinging structure with and disconnect the same from said trunnion, and means to lock said axle against movement relatively to said base when said steering devices have been detached.

9. In a machine of the character described, a truck comprising a base, a steering axle, wheels on said axle, and a trunnion connecting said axle with said base; a structure mounted on said truck for swinging movement, an arm rigidly secured to said trunnion, a link detachably connected at one end with said arm and connected at its other end with said swinging structure, and means for locking said arm against movement relatively to said base when said link has been detached therefrom.

In testimony whereof, we affix our signatures hereto.

CHARLES B. KING.
BENJAMIN JACOBY.
HERBERT E. ROUSH.